(12) United States Patent
Makita

(10) Patent No.: US 12,736,633 B2
(45) Date of Patent: Sep. 15, 2026

(54) OPTICAL APPARATUS, IN-VEHICLE SYSTEM, MOVING APPARATUS, MANUFACTURING METHOD OF OPTICAL APPARATUS

(71) Applicant: CANON KABUSHIKI KAISHA, Tokyo (JP)

(72) Inventor: Yasuhiro Makita, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1036 days.

(21) Appl. No.: 17/724,385

(22) Filed: Apr. 19, 2022

(65) Prior Publication Data

US 2022/0342046 A1 Oct. 27, 2022

(30) Foreign Application Priority Data

Apr. 26, 2021 (JP) ................................ 2021-073927

(51) Int. Cl.

| | |
|---|---|
| ***G01S 7/481*** | (2006.01) |
| ***G01S 7/4865*** | (2020.01) |
| ***G01S 17/08*** | (2006.01) |
| ***G01S 17/931*** | (2020.01) |
| ***G02B 3/00*** | (2006.01) |
| ***G02B 7/02*** | (2021.01) |

(52) U.S. Cl.

CPC .......... *G01S 7/4817* (2013.01); *G01S 7/4812* (2013.01); *G01S 7/4814* (2013.01); *G01S 7/4865* (2013.01); *G01S 17/08* (2013.01); *G01S 17/931* (2020.01); *G02B 3/0075* (2013.01); *G02B 7/025* (2013.01)

(58) Field of Classification Search

CPC ..... G02B 7/025; G02B 3/0075; G01S 7/4817; G01S 7/4865; B60T 2201/022

See application file for complete search history.

(56) References Cited

U.S. PATENT DOCUMENTS

| | | | | |
|---|---|---|---|---|
| 2012/0019940 A1* | 1/2012 | Lu | H04N 23/63 | 359/819 |
| 2016/0097912 A1* | 4/2016 | Kobori | G02B 7/028 | 359/820 |
| 2016/0144838 A1* | 5/2016 | Spencer | B60W 30/0953 | 701/1 |
| 2019/0187255 A1* | 6/2019 | Jang | G02B 7/021 | |
| 2022/0317266 A1* | 10/2022 | Kimura | G01S 7/4814 | |

FOREIGN PATENT DOCUMENTS

| | | |
|---|---|---|
| CN | 102597694 A | 7/2012 |
| CN | 105103026 A | 11/2015 |
| CN | 106199898 A | 12/2016 |
| CN | 109690887 A | 4/2019 |

(Continued)

*Primary Examiner* — Alexander P Gross

(74) *Attorney, Agent, or Firm* — Canon U.S.A., Inc., IP Division

(57) ABSTRACT

An optical apparatus includes a first base and a second base, an optical element held by at least one of the first and second bases, and an adhesive configured to adhere the first and second bases to each other. The first base further includes a first recessed portion into which the second base is inserted, a first contact portion contacting the second base, and a groove portion configured to allow at least a part of the adhesive to enter therein. The second base includes a second contact portion configured to contact the first contact portion.

18 Claims, 8 Drawing Sheets

(56) References Cited

FOREIGN PATENT DOCUMENTS

| | | | |
|---|---|---|---|
| DE | 102004036547 | A1 | 3/2006 |
| JP | H0954233 | A | 2/1997 |
| JP | 2003219235 | A | 7/2003 |
| JP | 2011-47832 | A | 3/2011 |
| JP | 2020013054 | A | 1/2020 |
| JP | 2021018228 | A | 2/2021 |
| WO | 2014167994 | A1 | 10/2014 |

* cited by examiner

OPTICAL APPARATUS, IN-VEHICLE SYSTEM, MOVING APPARATUS, MANUFACTURING METHOD OF OPTICAL APPARATUS

BACKGROUND

Technical Field

The disclosure relates to an optical apparatus, an in-vehicle system, a moving apparatus, and a manufacturing method of an optical apparatus.

Description of the Related Art

A laser radar apparatus using a laser beam or so-called Light Detection And Ranging (LIDAR) has recently been proposed in order to measure a distance between two cars (inter-vehicle distance). LIDAR can detect the presence or absence of an obstacle by irradiating a laser beam such as infrared light onto a target area and by detecting reflected light, but it is necessary to adjust a shape of the laser beam in the target area. Japanese Patent Laid-Open No. ("JP") 2011-47832 discloses a laser radar provided with a condenser lens for adjusting a shape of a laser beam.

In order to adjust the shape of the laser beam, it is necessary to adjust a divergent angle of the laser beam and the width of the laser beam in the target area by changing a relative position between the light source and the lens. The configuration of the laser radar disclosed in JP 2011-47832 cannot adjust the relative position between the light source and the lens with high accuracy.

SUMMARY

One aspect of the embodiments provides an optical apparatus, an in-vehicle apparatus, a moving apparatus, and a method for manufacturing the optical apparatus, each of which can be highly accurately positioned.

An optical apparatus according to one aspect of the embodiments includes a first base and a second base, an optical element held by at least one of the first and second bases, and an adhesive configured to adhere the first and second bases to each other. The first base further includes a first recessed portion into which the second base is inserted, a first contact portion contacting the second base, and a groove portion configured to allow at least a part of the adhesive to enter therein. The second base includes a second contact portion configured to contact the first contact portion.

Further features of the disclosure will become apparent from the following description of exemplary embodiments with reference to the attached drawings.

DESCRIPTION OF THE EMBODIMENTS

Referring now to the accompanying drawings, a detailed description will be given of embodiments according to the disclosure.

Comparative Example

Figure 8A:
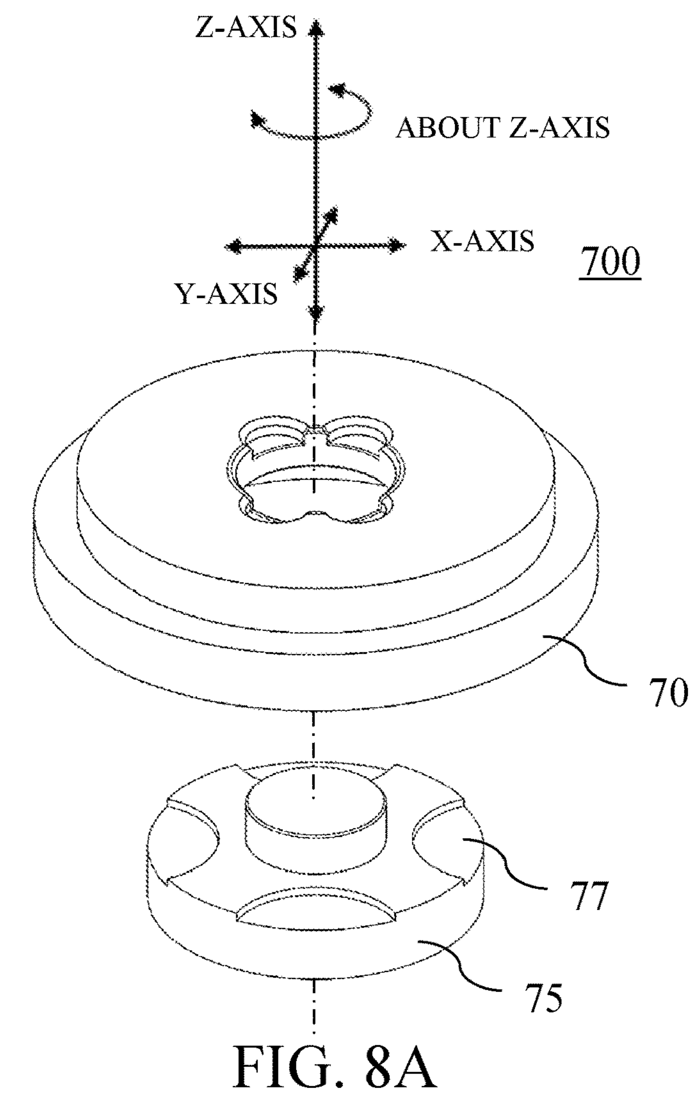
FIGS. 8A and 8B explain an optical apparatus according to a comparative example.
Figure 8B:
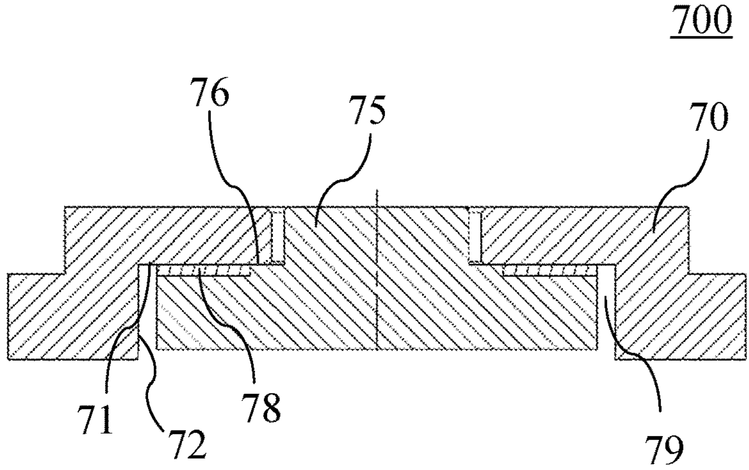

Referring now to FIGS. 8A and 8B, a description will be given of an optical apparatus according to a comparative example. FIGS. 8A and 8B explain an optical apparatus 700 according to the comparative example. FIG. 8A is an exploded perspective view of the optical apparatus 700 illustrating how a second base (second substrate) 75 is inserted into a first base (first substrate) 70. FIG. 8B is a sectional view of the optical apparatus 700 in which the second base 75 has been inserted into the first base 70 and a contact surface 71 of the first base 70 contacts a contact surface 76 of the second base 75 in a Z-axis direction.

The optical apparatus 700 includes the first base 70 and the second base 75. The first base 70 has a recessed portion 72 into which the second base 75 can be inserted. The recessed portion 72 has the contact surface 71 of the first base 70. The contact surface 76 of the second base 75 has an adhesive groove portion 77 that is lower by one step, and a space between the adhesive groove portion 77 and the contact surface 71 of the first base 70 is filled with an adhesive (thermosetting adhesive) 78. The first base 70 and the second base 75 are adhered to each other by the adhesive 78. At least one of the first base 70 and the second base 75 holds an optical element.

In assembling the optical apparatus 700, first, the adhesive groove portion 77 of the second base 75 is previously filled with the thermosetting adhesive 78. Next, the second base 75 is inserted into the recessed portion 72 in the first base 70 until the contact surfaces 76 and 78 of both bases contact each other, and the second base 75 is urged in the Z-axis direction with a jig (not shown) such as a spring, so as to determine the position of the second base 75 in the Z-axis direction. A gap 79 is provided in the X-axis direction and the Y-axis direction in FIG. 8A between the first base 70 and the second base 75, and positions of both bases in the X-axis direction and the Y-axis direction and the relative position in the rotation direction θZ around the Z-axis are adjustable. The contact surface 71 of the first base 70 and the contact surface 76 of the second base 75 are forced to contact each other in the Z-axis direction by the jig or the like. While the position in the Z-axis direction is maintained, the position in each of the X-axis direction and the Y-axis direction and the relative position in the rotation direction θZ around the Z-axis are adjusted, and then the assembled product is heated for a certain period of time to cure the thermosetting adhesive 78.

In this structure, the adhesive may flow into the gap 79 between both bases in the X-axis direction and Y-axis direction before the adhesive cures, depending on the adjustment time and the number of adjustments for adjusting the relative positions of the first base 70 and the second base 75 in the X-axis direction, in the Y-axis direction, and around the Z-axis. When the adhesive flows into the gap 79 between both bases in the X-axis direction and the Y-axis direction, a positional shift from the adjusted positions may occur in the curing process due to contractile curing of the adhesive.

First Embodiment

Figure 1A:
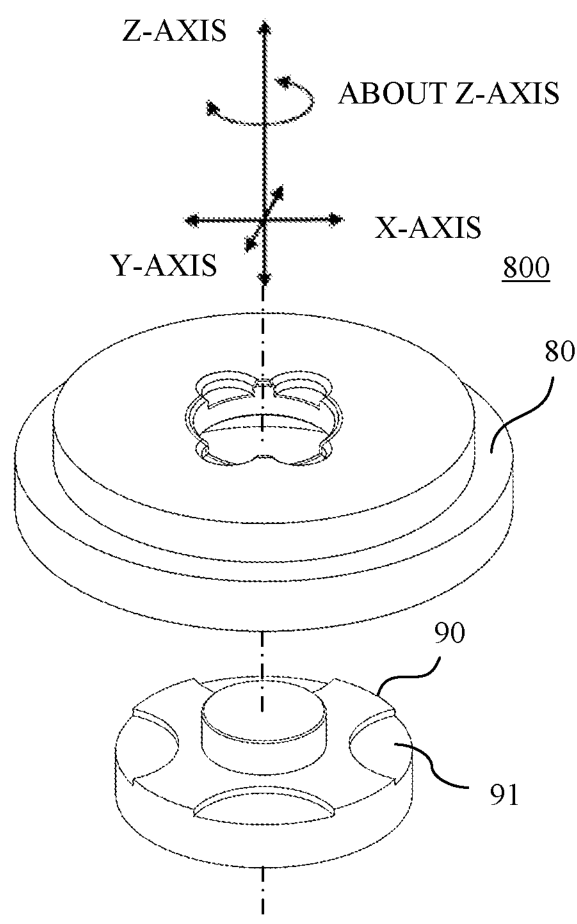
FIGS. 1A to 1F explain an optical apparatus according to a first embodiment.

Referring now to FIGS. 1A to 1F, a description will be given of an optical apparatus 800 according to a first embodiment of the disclosure. FIGS. 1A to 1F explain the optical apparatus 800 according to this embodiment. FIG. 1A is an exploded perspective view of the optical apparatus 800 illustrating how a second base 90 is inserted into a first base 80. FIGS. 1B to 1F are sectional views of the optical apparatus 800 in which the second base 90 has been inserted into the first base 80. FIGS. 1B to 1F illustrate modifications (optical apparatuses 800*a* to 800*e*) of the optical apparatus 800 according to this embodiment, respectively.

The optical apparatus 800 according to this embodiment includes the first base 80 and the second base 90. The first base 80 has a recessed portion (first recessed portion, concave portion) 82 into which the second base 90 can be inserted. The recessed portion 82 has a contact surface (first contact portion) 81. A contact surface (second contact portion) 96 of the second base 90 has recessed portion (second recessed portion) 91 such that the contact surface 81 has a step-like structure, and the space created by the second recessed portion 91 is filled with an adhesive (thermosetting adhesive) 88. The first base 80 and the second base 90 are adhered to each other by the adhesive 88. At least one of the first base 80 or the second base 90 holds an optical element. The optical element is, for example, a lens that transmits light emitted from a light source.

Figure 1B:
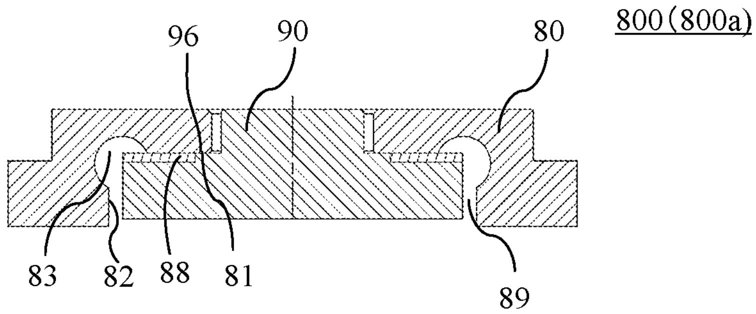
Figure 1C:
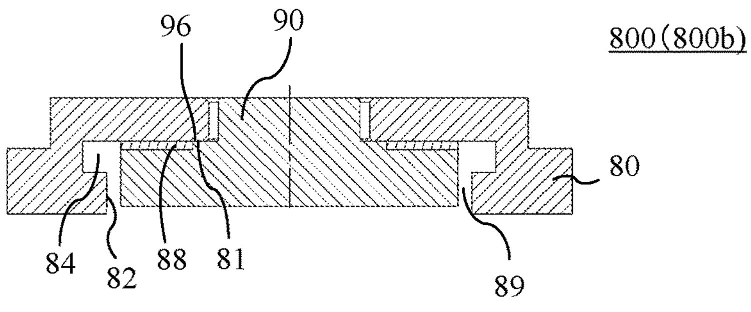
Figure 1D:
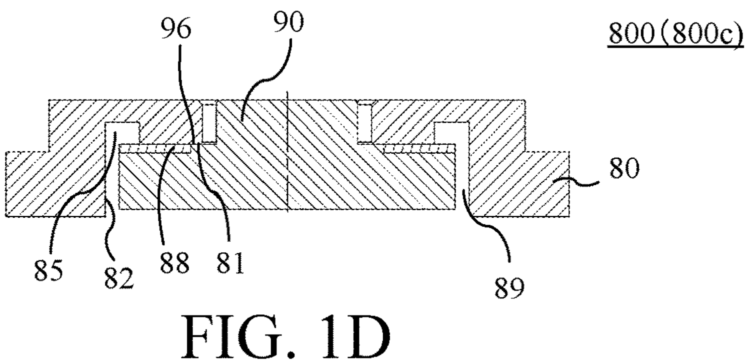

In order to avoid a relative positional shift between the first base 80 and the second base 90 during the manufacturing process, the optical apparatus 800 has an escape groove (groove portion) 83 recessed from a top corner of the recessed portion 82 of the first base 80 as illustrated in FIG. 1B. The escape groove 83 is not limited to be formed from the top corner of the recessed portion 82, but may also be formed on a bottom surface of the recessed portion 82. That is, the escape groove 83 is formed on at least one of the side surface and the bottom surface of the recessed portion 82. For example, if the recessed portion 82 is hemispherical, the escape groove 83 may be provided on a surface constituting the hemisphere.

The escape groove 83 houses an adhesive pool for the positional adjustment even when the relative positions between the first base 80 and the second base 90 are adjusted in the X-axis direction, in the Y-axis direction, and around the Z-axis. The escape groove 83 can prevent the adhesive from flowing into a gap 89 between the first base 80 and the second base 90 in the X-axis direction and the Y-axis direction. As a result, in the contractile curing process of the adhesive, the positional shift from the adjusted positions (relative positions) between the first base 80 and the second base 90 can be suppressed, and highly accurate positioning can be realized.

As described above, the optical apparatus 800 (800*a*) according to this embodiment includes the escape groove 83 at the corner of the recessed portion 82 of the first base 80. The shape of the escape groove 83 is not limited to that illustrated in FIG. 1B. For example, the escape groove may have a shape, such as that of an escape groove 84 formed in the optical apparatus 800*b* of FIG. 1C or that of an escape groove 85 formed in the optical apparatus 800*c* of FIG. 1D as long as it can house the adhesive pool for the position adjustment. That is, the first base 80 has the recessed portion 82 into which the second base 90 is inserted, the contact surface 81 that contacts the second base 90, and the escape groove 83, 84, or 85 that can house the overflowing adhesive 88 or which the overflowing adhesive 88 can enter). The second base 90 has the contact surface 96 that contacts the contact surface 81. The escape grooves 83, 84, and 85 may be formed adjacent to the contact surface 81. The escape grooves 83, 84, and 85 may be formed on the side surface (corner portion) of the recessed portion 82. The escape grooves 83, 84, and 85 may be formed at positions facing an adhesive groove portion 91.

Figure 1E:
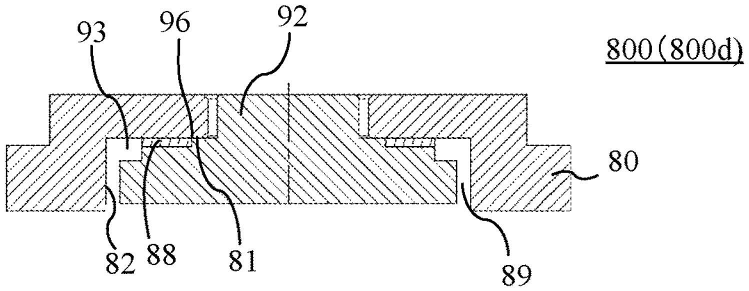
Figure 1F:
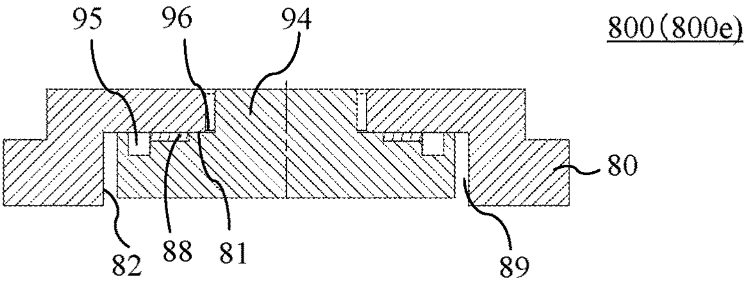

As another structure, as illustrated in FIG. 1E, an escape groove 93 that can house the adhesive pool for the position adjustment may be provided on part or the entire circumference of the outer peripheral portion of the second base 92. As yet another configuration, as illustrated in FIG. 1F, an escape groove 95 may be provided on part or the entire circumference of the contact surface 96 of the second base 94 to house the adhesive pool for the position adjustment. That is, the first base 80 includes the recessed portion 82 into which the second base 92 or 94 is inserted, and the contact surface 81 that contacts the second base 92 or 94. The second base 92 or 94 includes the contact surface 96 that contacts the contact surface 81 and the escape groove 93 or 95 for housing the overflowing adhesive 88 (or which the adhesive 88 can enter). The escape groove 93 or 95 may be formed adjacent to the adhesive groove portion 91. The escape groove 93 or 95 may be formed at positions facing the adhesive groove portion 91. In this embodiment, the adhesive groove portion 91 may be provided on the contact surface 81 of the first base 80 instead of the second base 90, 92, or 94.

Second Embodiment

Figure 2:
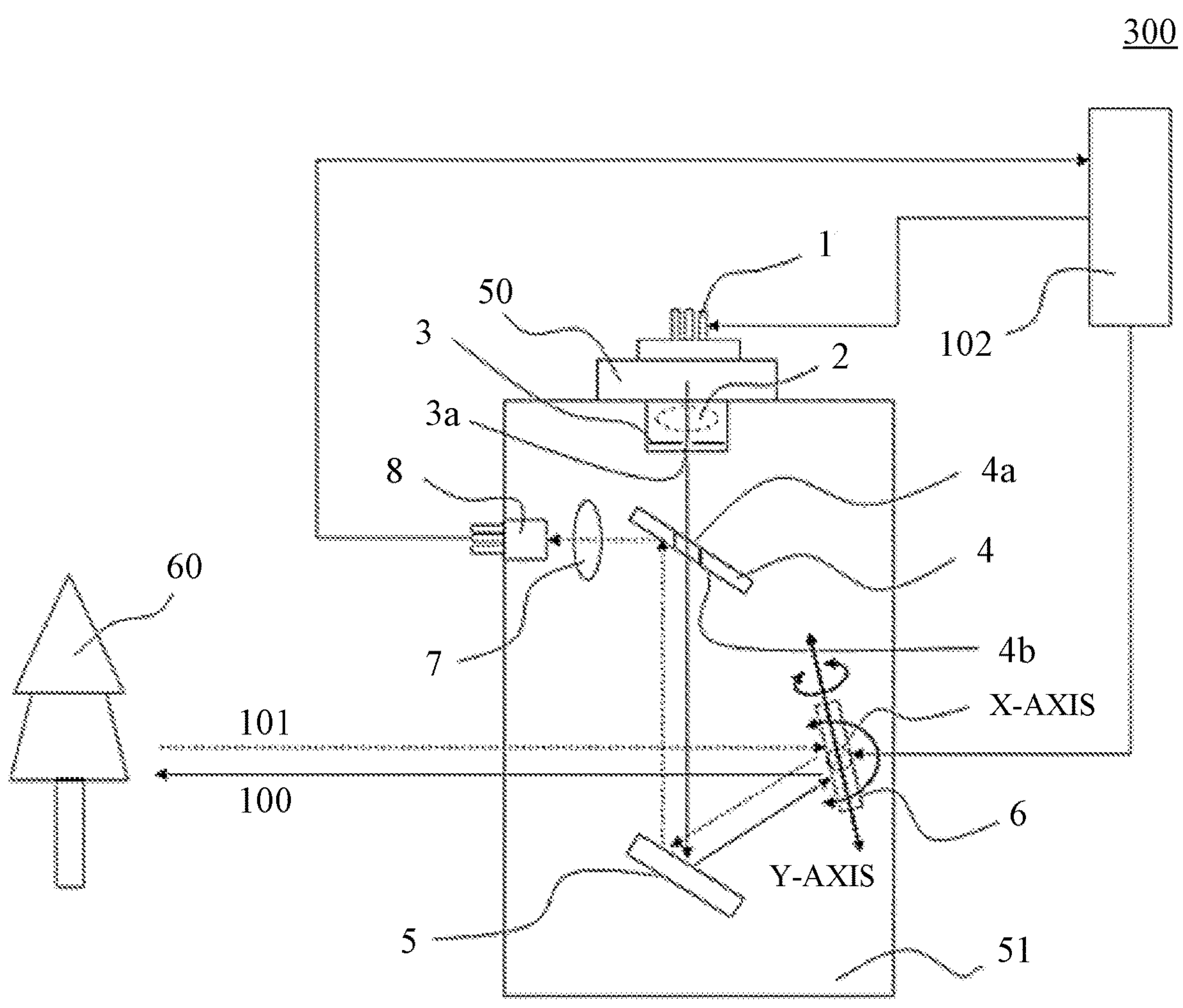
FIG. 2 is a configuration diagram of an optical apparatus according to a second embodiment.

Referring now to FIG. 2, a description will be given of an optical apparatus (LIDER) 300 according to a second embodiment of the disclosure. LIDAR includes an illumination system that illuminates an object (target), and a reception system that receives reflected light or scattered light from the object. LIDAR is classified into a coaxial system in which the directions of the illumination system and the reception system are the same, and a noncoaxial system in which the illumination system and the reception system are separately configured. FIG. 2 is a block diagram of the optical apparatus 300 according to this embodiment. The optical apparatus 300 is a so-called coaxial system LIDAR in which the optical axes of the illumination system and the reception system are accorded with each other by a perforated mirror 4.

In FIG. 2, a light source generator (light projector) 50 includes a semiconductor laser (light source) 1 that emits a laser beam 100, a lens 2 that adjusts a beam shape in a target area of the laser beam 100 into a desired shape, and a diaphragm (fixed diaphragm) 3 that blocks unnecessary light of the laser beam 100. The laser beam 100 emitted from the light source generator 50 is projected through an opening 3*a* of the diaphragm 3. Thereafter, the laser beam 100 passes through a hole 4*a* in the perforated mirror 4 fixed and held by a base barrel 51, and is reflected by a fixed mirror 5 fixed and held by the base barrel 51. Thereafter, the laser beam 100 is irradiated onto the target area (object such as an obstacle 60) by a movable mirror 6 such as a MEMS (Micro Electro Mechanical System) mirror.

The movable mirror 6 fixed and held by the base barrel 51 is a biaxial drive mirror that rotates around the Y-axis or around the X-axis orthogonal to the Y-axis in FIG. 2. That is, the movable mirror 6 serves as a deflector that deflects the laser beam 100 from the semiconductor laser 1 to scan the object and deflects the reflected light 101 from the object. The laser beam 100 irradiated onto the target area returns to the movable mirror 6 as the reflected light 101 from the obstacle 60. The reflected light 101 reflected by the movable mirror 6 is reflected by the fixed mirror 5 fixed and held by the base barrel 51, reflected by a reflective surface 4*b* of the perforated mirror 4, and guided to a condenser lens 7 fixed and held by the base barrel 51. The reflected light 101 emitted from the condenser lens 7 is guided to the light receiving element 8. Thus, the perforated mirror 4 functions as a light guide unit that guides the laser beam 100 from the semiconductor laser 1 to the movable mirror 6 and guides the reflected light 101 from the movable mirror 6 to the light receiving element 8.

A controller 102 controls the semiconductor laser 1, the movable mirror 6, and the light receiving element 8. The controller 102 drives the semiconductor laser 1 and the movable mirror 6 at a predetermined drive voltage and a drive frequency, respectively, and measures the received waveform in the light reception by the light receiving element 8 at a specific frequency. The controller 102 measures a difference between the light receiving time obtained by the light receiving element 8 and the light emitting time of the semiconductor laser 1, or a difference between a phase of the light receiving signal obtained by the light receiving element 8 and a phase of an output signal from the semiconductor laser 1. The controller 102 determines a distance to the object by multiplying the difference by the light speed. Thus, the controller 102 acquires the distance information of the object based on the output of the light receiving element 8.

Figure 3:
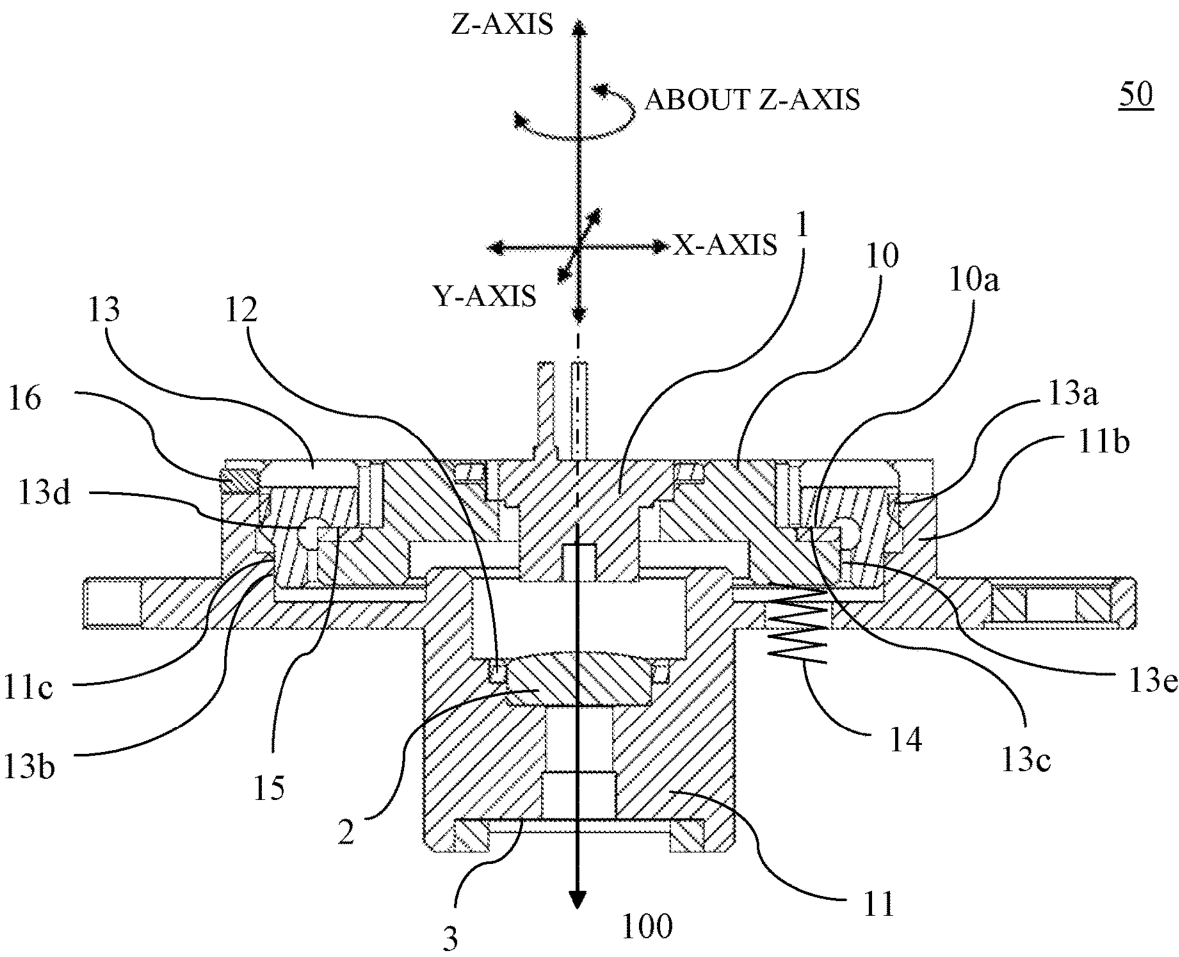
FIG. 3 is a sectional view of a light source generator according to the second embodiment.
Figure 4:
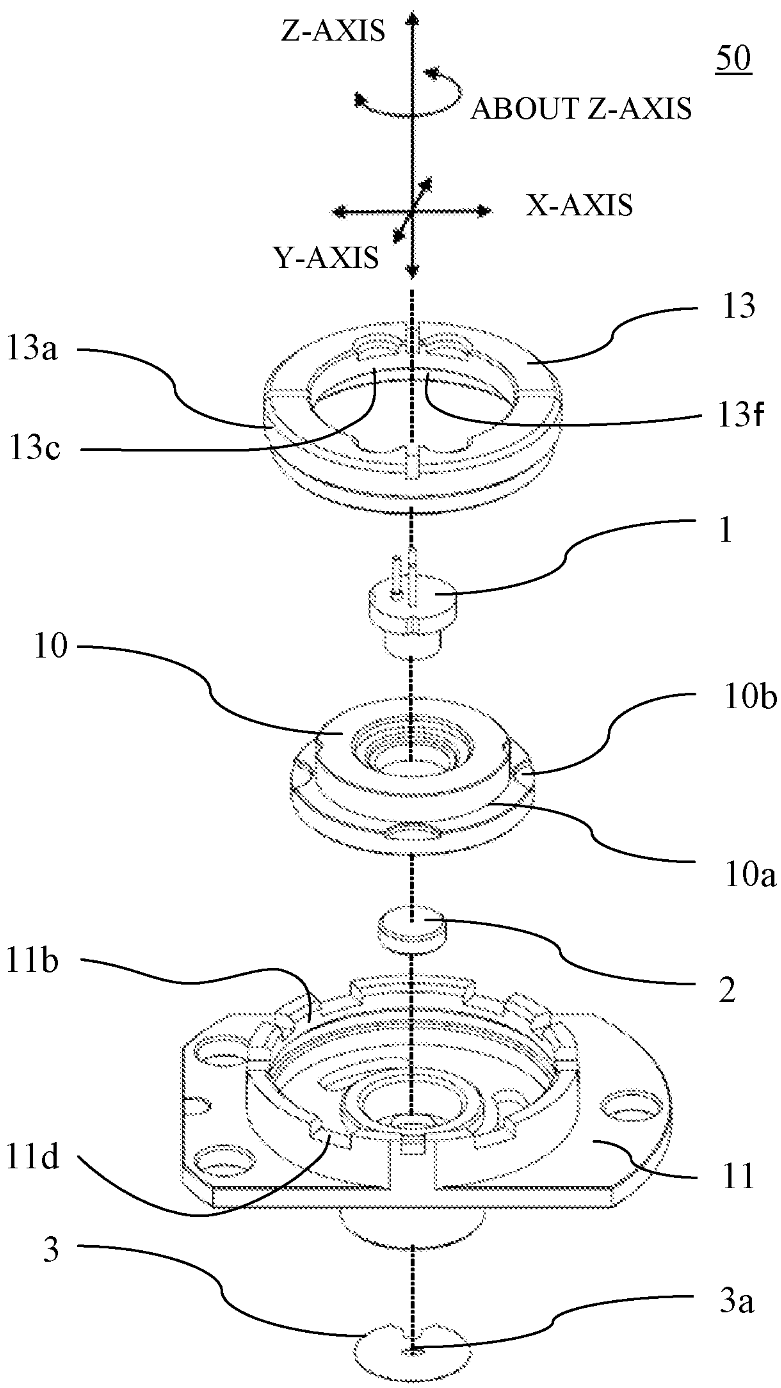
FIG. 4 is an exploded perspective view of the light source generator according to the second embodiment.

Referring now to FIGS. 3 and 4, a description will be given of the structure of the light source generator 50. FIG. 3 is a sectional view of the light source generator 50. FIG. 4 is an exploded perspective view of the light source generator 50.

In FIGS. 3 and 4, a lens holder (holding member) 11 holds the lens 2 and the diaphragm 3 that blocks unnecessary light of the laser beam 100. The lens 2 is fixed and held by the lens holder 11 with an adhesive 12. The semiconductor laser 1 is a light source in which a plurality of light emitting areas are stacked. The laser beam 100 emitted from the semiconductor laser 1 is emitted as a plurality of light beams in a direction in which a diameter of the emission area is smaller. The beam shape in the target area of the laser beam 100 significantly affects the LIDAR performance, and the positional relationship between the semiconductor laser 1 and the lens 2 needs to be adjusted with an accuracy of several μm.

Assume that the Z-axis direction is set to a spacing direction between the semiconductor laser 1 and the lens 2, and the X-axis direction and the Y-axis direction are set to parallel movement directions on a plane orthogonal to the Z-axis direction. The semiconductor laser 1 is fixed and held by an adhesive on a laser diode (LD) holder (light source holding member) 10 that holds the semiconductor laser 1. An adjusting ring (screw member) 13 is held in the Z-axis direction when a screw portion 13*a* is screwed with a screw portion 11*b* of the lens holder 11, and a biasing force of a biasing spring (elastic member) 14 eliminates the backlash of the screw portion 13*a* in the Z-axis direction. When a diameter engagement portion 13*b* is engaged with a diameter engagement portion 11*c* of the lens holder 11, positions of the adjusting ring 13 and the lens 2 in a direction orthogonal to the Z-axis direction are determined. In this embodiment, the second base in FIGS. 1A to 1F corresponds to the LD holder 10 holding the semiconductor laser 1, and the first base is an adjusting ring screwed and engaged with the lens holder 11.

The distance between the semiconductor laser 1 and the lens 2 in the Z-axis direction is adjusted by rotating the adjusting ring 13 around the Z-axis. At this time, a plane (flat surface) portion 10*a* forming a plane (flat surface) orthogonal to the Z-axis of the LD holder 10 is steadily biased by the biasing spring 14 to a plane (flat surface) portion 13*c* forming a plane orthogonal to the Z-axis of the adjusting ring 13. The plane portion 13*c* orthogonal to the Z-axis of the adjusting ring 13 is located in a recessed portion 13*f* of the adjusting ring 13. When the plane portion 13*c* contacts the plane portion 10*a* forming the plane orthogonal to the Z-axis of the LD holder 10 that has been inserted into the recessed portion 13*f*, a structure including the light source generator 50 and the optical apparatus 300 is entirely smaller. By adjusting the position in the Z-axis direction, the beam shape in the target area of the laser beam 100 emitted from the semiconductor laser 1 can be adjusted to a desired shape. After the position is adjusted, the adhesive 16 is applied (provided) to the adhesive groove portion 11*d* of the lens holder 11 and cured while being biased by the biasing spring 14, so that the distance in the Z-axis direction between the adjusting ring 13 and the lens holder 11 can be fixed.

Next, positions of the semiconductor laser 1 and the lens 2 in the X-axis direction and the Y-axis direction orthogonal to the Z-axis direction and angular positions of the semiconductor laser 1 and the lens 2 around the Z-axis are adjusted by moving the LD holder 10 relative to the lens holder 11. The plane portion 10*a* of the LD holder 10 is biased to the plane portion 13*c* of the adjusting ring 13 without play by the biasing spring 14, and its positions in the X-axis direction and the Y-axis direction and its angular position around the Z-axis can be adjusted while the position of the LD holder 10 in the Z-axis direction is maintained. The beam in the target area of the laser beam 100 emitted from the semiconductor laser 1 can be adjusted to a proper position by adjusting the positions in the X-axis direction and the Y-axis direction, and the angular position around the Z-axis.

The plane portion 10*a* of the LD holder 10 includes a plane portion (concave surface) 10*b* that is lower by one step, and the thermosetting adhesive 15 is filled in a space between the plane portion 10*b* and the plane portion 13*c* of the adjusting ring 13. An escape groove 13*d* is provided at a corner of the recessed portion 13*f* of the adjusting ring 13. Thereby, the thermosetting adhesive 15 overflowing from the plane portion 10*b* can be prevented from flowing into the gap 13*e* between the LD holder 10 and the adjusting ring 13 when the positions in the X-axis direction and the Y-axis direction and the angle around the Z-axis are adjusted. Instead, it is conceivable to adjust an adhesive amount to be applied so as to prevent the thermosetting adhesive 15 from overflowing from the plane portion 10*b* in adjusting the positions in the X-axis direction and the Y-axis direction and the angle around the Z-axis. However, in order to prevent the thermosetting adhesive 15 from overflowing from the plane portion 10*b*, it is necessary to optimize the adhesive application amount while the volume variation of the plane portion 10*b* due to the individual difference is checked for each component and thus productivity may decrease.

After the positions in the X-axis direction and the Y-axis direction and the angle around the Z-axis of the LD holder 10 are determined, the thermosetting adhesive 15 is cured by heating. By fixing the LD holder 10 to the adjusting ring 13, the positional relationship between the semiconductor laser 1 and the lens 2 is fixed and held. At this time, the positional relationship between the LD holder 10 and the adjusting ring 13 in the Z-axis direction is determined by the contact between the plane portions 10*a* and 13*c*, and is not affected by the contractile curing of the thermosetting adhesive 15. Due to the biasing force of the biasing spring 14 and the contractile curing of the thermosetting adhesive 15, a frictional force is generated between the plane portion 10*a* of the LD holder 10 and the plane portion 13*c* of the adjusting ring 13. Hence, the positions in the X-axis direction, the Y-axis direction, and around the Z-axis can be fixed without any shift.

The positions of the light source generator 50 in which the positional relationship between the semiconductor laser 1 and the lens 2 has been adjusted and fixed are adjusted in the X-axis direction and the Y-axis direction relative to the base barrel 51 so that it is accommodated in the target area of the movable mirror 6 attached to the base barrel 51, and then adhered and fixed. The positional relationship between the light source generator 50 and the base barrel 51 may have an adjustment accuracy of several tens of μm.

Thus, this embodiment can adjust the positional relationship between the semiconductor laser 1 and the lens 2 in the X-axis direction, the Y-axis direction, and the Z-axis direction, and around the Z-axis with high accuracy. That is, the position in the Z-axis direction is adjusted by the adjusting ring 13 screwed with the lens holder 11 through a screw structure, and the positions in the X-axis direction, the Y-axis direction, and the angular position around the Z-axis are adjusted by a movement on the contact plane between the plane portion 13*c* of the adjusting ring 13 and the plane portion 10*a* of the LD holder 10. The structure that is not affected by the contractile curing of the adhesive can maintain a highly accurate relative positional relationship even when the adhesive is used for fixing and holding.

This embodiment uses the coaxial LIDAR an example, but the disclosure is not limited to this embodiment. Each embodiment is also applicable to the noncoaxial LIDAR and an optical apparatus such as a laser irradiation apparatus other than LIDAR.

Third Embodiment

Figure 5:
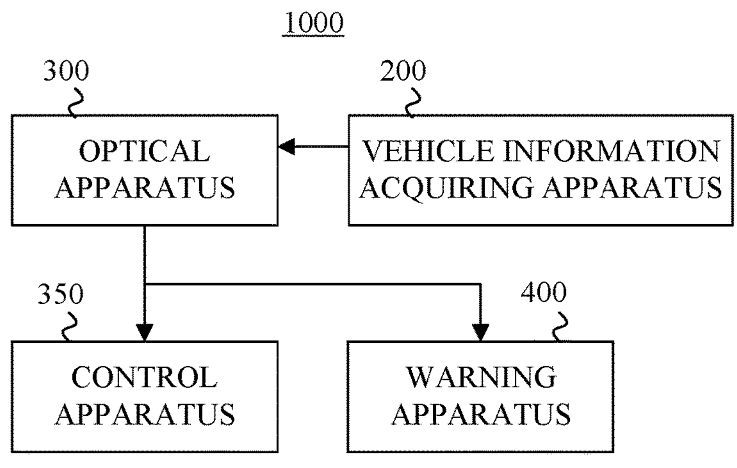
FIG. 5 is a block diagram of an in-vehicle system according to a third embodiment.
Figure 6:
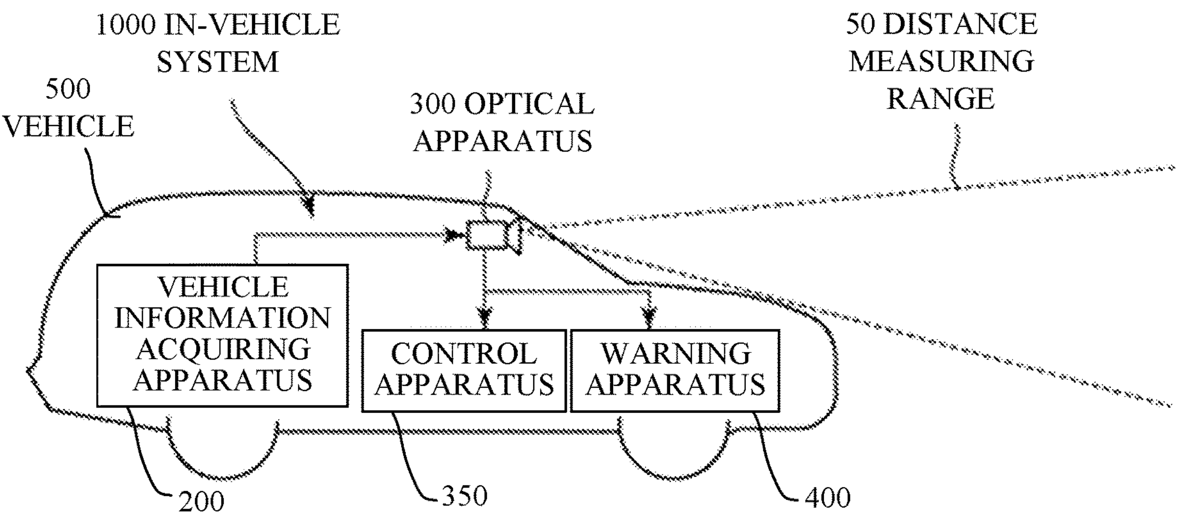
FIG. 6 is a schematic diagram of a vehicle according to the third embodiment.
Figure 7:
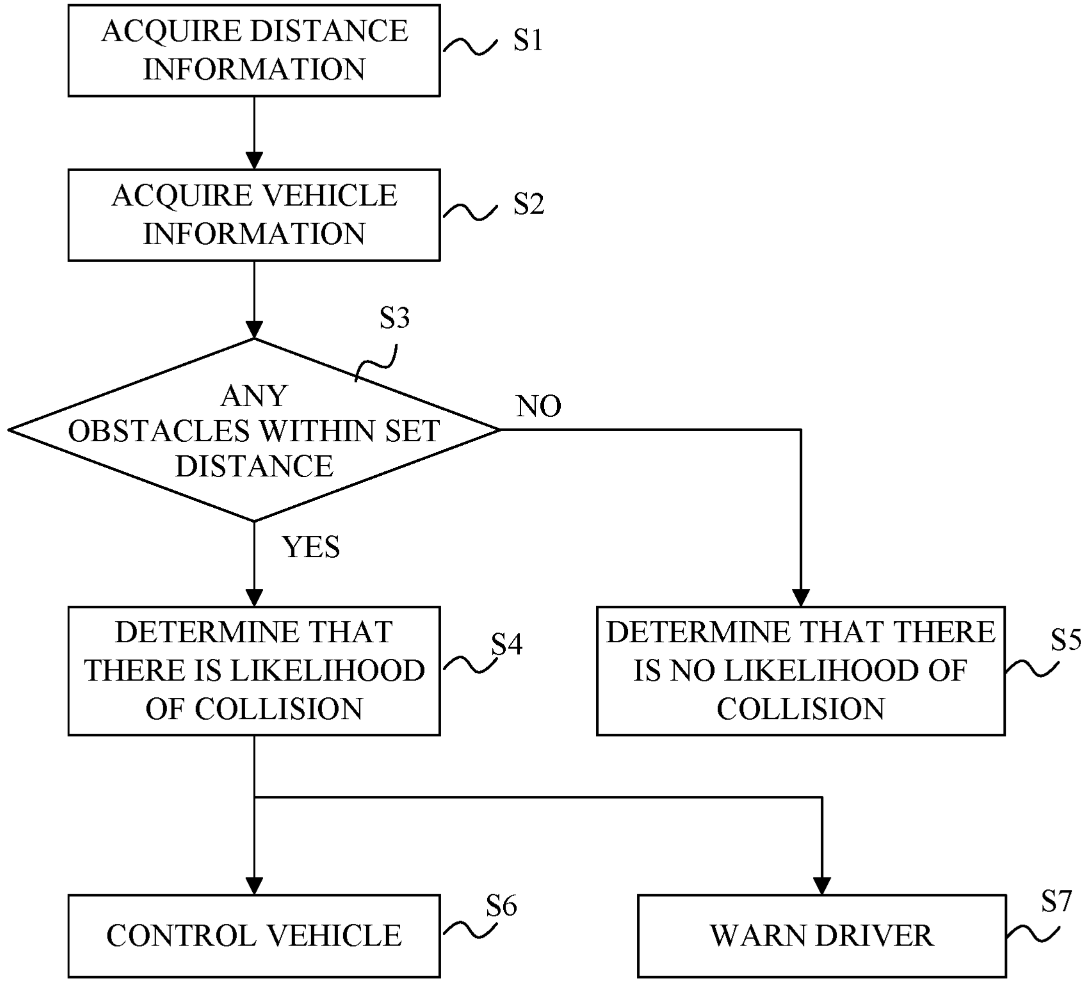
FIG. 7 is a flowchart showing an operation example of the in-vehicle system according to the third embodiment.

Referring now to FIGS. 5 to 7, a description will be given of an in-vehicle system (driving support apparatus) 1000 according to a third embodiment of the disclosure. The in-vehicle system 1000 includes an optical apparatus (LIDER) 300 according to the second embodiment.

FIG. 5 is a block diagram of the in-vehicle system 1000. The in-vehicle system 1000 has a system held by a (movable) moving unit (moving apparatus) such as an automobile (vehicle) and configured to support driving (steering) of the vehicle based on distance information of an object such as an obstacle or a pedestrian about the vehicle acquired by the optical apparatus 300. FIG. 6 is a schematic diagram of the vehicle 500 as the moving apparatus including the in-vehicle system 1000. In FIG. 6, a distance measuring range (detection range) of the optical apparatus 300 is set in front of the vehicle 500, but the distance measuring range may be set in the rear or side of the vehicle 500.

As illustrated in FIG. 5, the in-vehicle system 1000 includes an optical apparatus 300, a vehicle information acquiring apparatus 200, a control apparatus (ECU: electronic control unit hereinafter) 350, and a warning apparatus (warning unit) 400. The optical apparatus 300 includes the controller 102 (see FIG. 2) that serves as a distance acquiring unit (acquiring unit) and a collision determining unit (determination unit). If necessary, the in-vehicle system 1000 may include the distance acquiring unit and the collision determining unit separate from the controller 102, and each unit may be provided outside the optical apparatus 300 (for example, inside the vehicle 500). Alternatively, the control apparatus 350 may include at least part of the functions of the controller 102.

FIG. 7 is a flowchart showing an operation example of the in-vehicle system 1000. A description will now be given of an operation of the in-vehicle system 1000 with reference to this flowchart.

First, in the step S1, the light source generator (light source unit) 50 of the optical apparatus 300 illuminates an object around the vehicle, and the controller 102 acquires distance information of the object by receiving reflected light from the object based on a signal output from the light receiving element 8. In the step S2, the vehicle information acquiring apparatus 200 acquires vehicle information including a vehicle speed, a yaw rate, a steering angle, and the like of the vehicle. Next, in the step S3, the controller 102 determines whether or not the distance to the object is included in the preset distance range using the distance information acquired in the step S1 and the vehicle information acquired in the step S2.

This configuration can determine whether or not the object exists within the set distance around the vehicle, and also determine a likelihood of collision between the vehicle and the object. The steps S1 and S2 may be performed in reverse order or in parallel. The controller 102 determines that "there is a likelihood of collision" when the object exists within the set distance (step S4) and determines that "there is no likelihood of collision" when the object does not exist within the set distance (step S5).

Next, when the controller 102 determines that "there is the likelihood of collision," the controller 102 notifies (transmits) the determination result to the control apparatus 350 and the warning apparatus 400. At this time, the control apparatus 350 controls the vehicle based on the determination result of the controller 102 (step S6), and the warning apparatus 400 warns a vehicle user (driver, passenger) based on the determination result of the controller 102 (step S7). The determination result may be notified to at least one of the control apparatus 350 and the warning apparatus 400.

The control apparatus 350 can control the movement of the vehicle by outputting a control signal to a driving unit (engine, motor, etc.) of the vehicle. For example, the vehicle provides control such as applying a brake, releasing a gas pedal, turning a steering wheel, generating a control signal for generating a braking force on each wheel, and suppressing an output of an engine or a motor. The warning apparatus 400 warns the user, for example, by issuing an alert sound, displaying warning information on a screen of a car navigation system, or vibrating a seat belt or steering wheel.

Thus, the in-vehicle system 1000 can detect an object and measure a distance using the above processing, and can avoid any collisions between the vehicle and the object. In particular, applying the optical apparatus 300 to the in-vehicle system 1000 can realize high distance measurement accuracy, so that the object detection and collision determination can be performed with high accuracy.

This embodiment applies the in-vehicle system 1000 to the driving support (collision damage reduction), but the disclosure is not limited to this embodiment. The in-vehicle system 1000 may be applied to adaptive cruise control and automatic driving. The in-vehicle system 1000 can be applied not only to a vehicle such as an automobile but also to a moving body such as a ship, an aircraft, or an industrial robot. The in-vehicle system 1000 can also be applied to various devices that utilize object recognition such as an intelligent transportation system (ITS) and a monitoring system as well as the moving body.

The in-vehicle system 1000 and the vehicle 500 may include a notification apparatus (notification unit) that notifies a manufacturer of the in-vehicle system 1000 and a seller (dealer) of the vehicle 500 of any collisions between the vehicle 500 and an obstacle. For example, the notification apparatus may transmit information (collision information) on a collision between the vehicle 500 and the obstacle to a preset external notification destination by e-mail or the like.

Thus, adopting a configuration in which collision information is automatically notified by the notification apparatus can promptly take measures such as inspection and repair after the collision. The notification destination of the collision information may be an insurance company, a medical institution, the police, or any other device set by the user. The notification apparatus may notify the notification destination of not only the collision information but also failure information of each component and consumption information of consumables. The presence or absence of the collision may be detected by using the distance information acquired based on the output from the light receiving element 8 described above, or by another detector (sensor).

Each embodiment provides the escape groove at the corner of the recessed portion of the first base, and can prevent the adhesive overflowing from the adhesive groove portion from flowing into the adjustment gap between the first base and the second base in the X-axis direction and the Y-axis direction when the relative positions of the first base and the second base are adjusted. Thereby, positional shifts from the positions of both bases that have been adjusted with high accuracy can be suppressed in the contractile curing process of the adhesive, and each embodiment can provide relative positioning with high accuracy. Therefore, each embodiment can provide an optical apparatus, an in-vehicle device, a moving apparatus, and a method for manufacturing the optical apparatus, each of which is positioned with high accuracy.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-073927, filed on Apr. 26, 2021, which is hereby incorporated by reference herein in its entirety.

What is claimed is:

1. An optical apparatus comprising:

a first base and a second base;

an optical element held by at least one of the first and second bases; and an adhesive configured to adhere the first and second bases to each other, wherein the first base includes a first recessed portion into which the second base is inserted, a first contact portion contacting the second base, and a groove portion configured to allow at least a part of the adhesive to enter therein, the second base includes a second contact portion configured to contact the first contact portion, at least one of the first and second bases includes a second recessed portion for storing the adhesive configured to adhere the first and second bases to each other, a gap is provided between the first and second bases in a direction perpendicular to a contact direction of the first and second contact portions, the groove portion is provided between the second recessed portion and the gap, on a surface of the first recessed portion facing the second base, the surface having a step-like structure, and the gap is direct communication with the groove portion.

2. The optical apparatus according to claim 1, wherein the groove portion is adjacent to the first contact portion.

3. The optical apparatus according to claim 1, wherein the groove portion faces the second recessed portion.

4. The optical apparatus according to claim 1, wherein the adhesive is a thermosetting adhesive.

5. The optical apparatus according to claim 1, further comprising a light source held by the second base, wherein the optical element held by the first base is a lens configured to transmit light emitted from the light source.

6. The optical apparatus according to claim 1, wherein the first base is a screw member engaged with a holding member configured to hold the optical element, and wherein another gap, provided between the first base and the holding member in the contact direction, is adjusted by rotating the screw member around the contact direction.

7. The optical apparatus according to claim 1, further comprising a deflector configured to deflect light from a light source to scan an object and to deflect reflected light from the object.

8. The optical apparatus according to claim 7, further comprising a light guide unit configured to guide the light from the light source to the deflector and to guide reflected light from the deflector to a light receiving element.

9. The optical apparatus according to claim 8, further comprising a controller configured to acquire distance information of the object based on an output from the light receiving element.

10. An in-vehicle system comprising the optical apparatus according to claim 8, wherein the in-vehicle system determines a likelihood of collision between a vehicle and the object based on distance information of the object obtained by the optical apparatus.

11. The in-vehicle system according to claim 10, further comprising a control apparatus configured to output a control signal for causing the vehicle to generate a braking force in a case where it is determined that the collision is likely between the vehicle and the object.

12. The in-vehicle system according to claim 10, further comprising a warning apparatus configured to warn a user of the vehicle in a case where it is determined that the collision is likely between the vehicle and the object.

13. A moving apparatus comprising the optical apparatus according to claim 8, wherein the moving apparatus holds and moves the optical apparatus.

14. The moving apparatus according to claim 13, further comprising a determination unit configured to determine a likelihood of collision with the object based on distance information of the object obtained by the optical apparatus.

15. An optical apparatus comprising:

a first base and a second base;

an optical element held by at least one of the first and second bases; and an adhesive configured to adhere the first and second bases to each other, wherein the first base includes a first recessed portion into which the second base is inserted, and a first contact portion configured to contact with the second base, the second base includes a second contact portion configured to contact the first contact portion and a groove portion configured to allow a part of the adhesive to enter, a contact surface of the first base directly contacts a contact surface of the second base, at least one of the first and second bases includes a second recessed portion for storing the adhesive configured to adhere the first and second bases to each other, a gap is provided between the first and second bases in a direction perpendicular to a contact direction of the first and second contact portions, and the groove portion is provided between the second recessed portion and the gap.

16. The optical apparatus according to claim 15, wherein the groove portion is adjacent to the second contact portion.

17. A method for manufacturing an optical apparatus that includes a first base, a second base, and an optical element held on at least one of the first and second bases, the method comprising:

an application step of applying an adhesive to the second base;

an insertion step of inserting the second base into a first recessed portion provided in the first base;

an adjustment step of adjusting relative positions of the first and second bases; and a curing step of curing the adhesive, wherein in the application step, a second recessed portion provided in the second base is applied the adhesive, wherein in the insertion step, the second base is inserted into the first recessed portion of the first base to provide a gap for adjusting the relative positions in a direction perpendicular to a contact direction of a first contact portion, contacted to the second base, of the first base and a second contact portion contacted to the first contact portion, of the first base, with a contact surface of the first base directly contacting a contact surface of the second base, and wherein in the adjustment step, part of the adhesive can enter a groove portion provided between the second recessed portion and the gap during adjusting the relative positions in the direction perpendicular to the contact direction and a direction around the contact direction.

18. The manufacturing method according to claim 17, wherein the curing step cures the adhesive by heating.

* * * * *